United States Patent
Mangal

(10) Patent No.: US 9,014,096 B1
(45) Date of Patent: *Apr. 21, 2015

(54) SYSTEM AND METHOD FOR DATA LINK LAYER HANDOFFS IN A WIRELESS NETWORK

(71) Applicant: Sprint Spectrum L.P., Overland Park, KS (US)

(72) Inventor: Manish Mangal, Plano, TX (US)

(73) Assignee: Sprint Spectrum L. P., Overland Park, KS (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/783,686

(22) Filed: Mar. 4, 2013

Related U.S. Application Data

(63) Continuation of application No. 10/368,722, filed on Feb. 19, 2003, now Pat. No. 8,391,203.

(51) Int. Cl.
*H04W 4/00* (2009.01)
*H04W 36/00* (2009.01)

(52) U.S. Cl.
CPC .................... *H04W 36/00* (2013.01)

(58) Field of Classification Search
None
See application file for complete search history.

(56) References Cited

U.S. PATENT DOCUMENTS

| | | | |
|---|---|---|---|
| 5,878,343 A | 3/1999 | Robert et al. | |
| 6,229,793 B1 | 5/2001 | Jawanda | |
| 6,385,195 B2 | 5/2002 | Sicher et al. | |
| 6,400,712 B1 | 6/2002 | Phillips | |
| 6,404,754 B1 | 6/2002 | Lim | |
| 6,424,639 B1 | 7/2002 | Lioy et al. | |
| 6,445,922 B1 | 9/2002 | Hiller et al. | |
| 6,501,953 B1 | 12/2002 | Braun et al. | |
| 6,766,168 B1 | 7/2004 | Lim | |
| 6,795,437 B1 | 9/2004 | Rasanen et al. | |
| 6,996,079 B1 | 2/2006 | Bergenwall et al. | |
| 8,391,203 B1 | 3/2013 | Mangal | |
| 2001/0001001 A1 | 5/2001 | Jawanda | |
| 2001/0015968 A1 | 8/2001 | Sicher et al. | |
| 2002/0015417 A1 | 2/2002 | Asahina | |
| 2002/0068592 A1 | 6/2002 | Hutcheson et al. | |
| 2002/0164988 A1 | 11/2002 | Vishwanathan et al. | |
| 2002/0176382 A1 | 11/2002 | Madour et al. | |
| 2003/0208602 A1* | 11/2003 | Bhalla et al. ................. | 709/227 |
| 2006/0182083 A1 | 8/2006 | Nakata et al. | |

OTHER PUBLICATIONS

C. Perkins, "IP Mobility Support," Network Working Group, Request for Comments 2002, Oct. 1996.
C. Perkins, Request for Comments 2003, "IP Encapsulation within IP," Oct. 1996.
S. Hanks et al., Request for Comments 1701, "Generic Routing Encapsulation (GRE)," Oct. 1994.
C. Perkins, Request for Comments 2004, "Minimal Encapsulation within IP," Oct. 1996.

* cited by examiner

*Primary Examiner* — Bob Phunkulh

(57) ABSTRACT

A wireless device may establish a data connection with a 2G or 3G wireless network, which the wireless device can then use to engage in packet data communications with other devices on packet data networks. The wireless device may then roam from one wireless network to the other wireless network, such by roaming from the 2G wireless network to the 3G wireless network or vice versa. The wireless device may then transfer its data connection between the networks, thereby allowing the wireless device to continue in any established data sessions with other devices.

13 Claims, 9 Drawing Sheets

SYSTEM AND METHOD FOR DATA LINK LAYER HANDOFFS IN A WIRELESS NETWORK

CROSS-REFERENCE TO RELATED APPLICATIONS

This application is a continuation of U.S. patent application Ser. No. 10/368,722, filed Feb. 19, 2003, which application is incorporated herein by reference.

FIELD OF THE INVENTION

This invention relates generally to wireless networks. More specifically it relates to a system and method for data link layer handoffs in a wireless network.

BACKGROUND OF THE INVENTION

In an exemplary 3G wireless network, a wireless device may communicate via an air interface with a base transceiver station ("BTS") and in turn with a base station controller ("BSC"). The BSC may then be coupled with a mobile switching center ("MSC"). Further, the BSC may be coupled with a packet data serving node ("PDSN") or other gateway, which may provide connectivity with an Internet Protocol ("IP") network, such as the Internet or an intranet (e.g., a wireless carrier's core IP network). The wireless device may thus communicate with entities on the IP network via communication path comprising the air interface, the BTS, the BSC and the PDSN.

A properly equipped wireless device can initiate packet-data communication by sending an initiation request message over an air interface signaling channel, and via the BSC, to the MSC. Applying industry standards, the initiation request message may include a "packet data" service option code that characterizes the requested communication as packet-data communications, as compared with traditional voice communication. When the MSC receives the initiation request, it may then detect the "packet data" service option code and responsively send the message back to the BSC for handling.

In turn, when the BSC receives the initiation request from the MSC, the BSC may establish a radio link layer connection with the wireless device, by assigning the wireless device to operate on a particular traffic channel over the air interface (e.g., a fundamental traffic channel, and perhaps one or more supplemental channels). In addition, the BSC may pass the initiation request to the PDSN. The PDSN and the wireless device may then negotiate with each other to establish a data-link layer connection, typically a point-to-point session ("PPP") over which packet data can be communicated between the wireless device and the PDSN.

The exemplary 3G wireless network may employ the Mobile IP. In order to support Mobile IP, the 3G wireless network may additionally include a home agent ("HA"). Alternatively, the HA may be integrated into the PDSN. Mobile IP provides functionality that allows a wireless device to move among BTSs that are serviced by different PDSNs without interrupting the wireless devices existing packet data session. The BTSs may be on the same 3G wireless network, or they may be on different wireless networks.

When the wireless device moves to a second BTS from a first BTS, the wireless device's data-link layer connection, such as a PPP connection, with the first PDSN might remain. The wireless device may register with a foreign agent ("FA") for the second PDSN, which in turn may provide a "care-of" address for the wireless device to a HA for the first PDSN.

Once the wireless device's registration has been updated, the HA for first PDSN continues to receive packets on behalf of the wireless device in its packet data session. Instead of sending the packets to the first BTS, the HA now forwards the packets to the wireless device's "care-of address", which is the FA. The FA then sends the packets to the second BTS for transmission to the wireless device.

While the wireless device may move between 3G wireless networks, it may also move from a 3G wireless network to a 2G wireless network. In a 2G wireless network, the wireless device communicates with entities on the IP network via communication path comprising the air interface, the BTS, the BSC, the MSC and an Internetworking Function ("IWF"). The wireless device engages in packet data communications by forming a circuit-switched connection with the IWF. The IWF in turn converts between the circuit-switched connection with the wireless device and a packet-switched connection with a packet data network. Thus, in a 2G wireless network, the IWF serves as a bridge between the wireless device and a packet data network.

2G wireless networks do not provide a mechanism for re-registering the location of the wireless device. When a wireless device moves from a 3G wireless network to 2G wireless network, the wireless device's original packet data connection with the 3G wireless network is dropped and the wireless device establishes a new data connection with the 2G wireless network. As a consequence, any data session with wireless device has established with other devices are also dropped. They too must be reestablished. Similarly problems occur when the wireless device moves from a 2G wireless network to a 3G wireless network or when the wireless device moves between 2G wireless networks.

Therefore, there exists a need to provide an improved system and method for allowing a wireless device to move among different types of wireless networks.

SUMMARY OF THE INVENTION

A wireless device may communicate with one or more different types of wireless networks, such 2G and 3G wireless networks. The wireless device may establish a data connection with one of these networks, such as the wireless device can use to engage data sessions with other devices on packet data networks. The wireless device may then move from one network to another network. For example, the wireless device may move between the 3G and 2G wireless networks, or it may move between different 2G wireless networks. The wireless device may also transfer its existing data connection between the networks, thereby allowing the wireless device to continue in any established data sessions with other devices.

The 2G wireless network may use an IWF to provide the wireless device with connectivity to packet data networks. The IWF can convert between a circuit-based communications with the wireless device and packet-based communications with the packet data networks. In order to allow the wireless device to transfer an existing data connection to or from the 2G wireless network, the IWF may be programmed with Mobile IP functionality. For example, the IWF may be programmed to act as a PDSN or HA.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
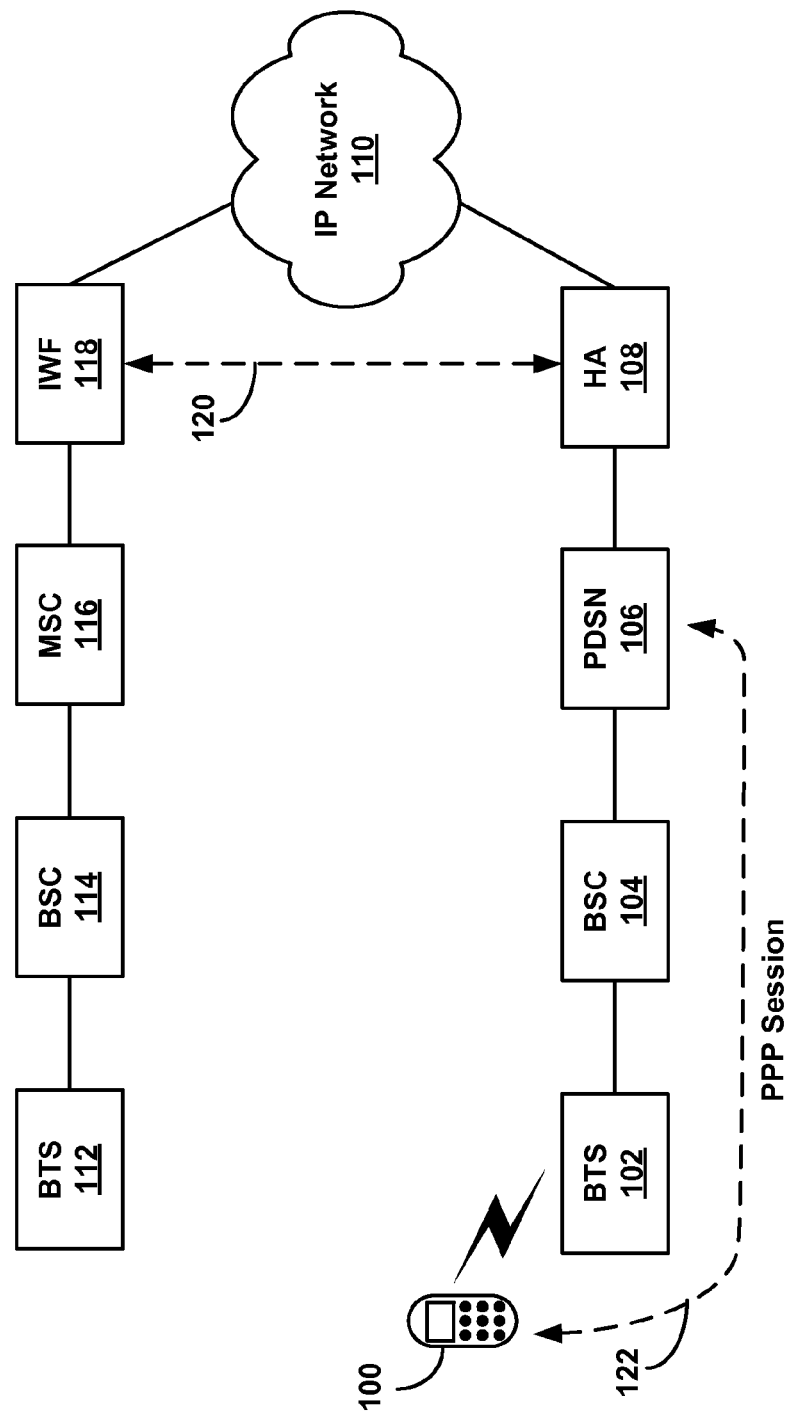
FIG. 1 is a block diagram of a wireless device establishing a data connection on a 3G wireless network that may in turn be transferred to a 2G wireless network via an interconnection between the two wireless networks.

FIG. 1 is a block diagram of a wireless device establishing a data connection on a 3G wireless network that may in turn be transferred to a 2G wireless network via an interconnection between the two wireless networks. As shown in FIG. 1, a wireless device 100 communicates with a BTS 102 via a wireless interface. The BTS 102 in turn connects to a BSC 104, which in turn connects to a PDSN 106. The PDSN 106 connects to a HA 108, which interfaces with an IP network 110. While FIG. 1 depicts the HA 108 as a separate component from the PDSN 106, the HA 108 and the PDSN 106 may be alternatively be integrated into a single component. Thus, 3G wireless network depicted in FIG. 1 generally includes the BTS 102, BSC 104, PDSN 106 and HA 108.

The wireless device 100 may communicate with the BTS 102 via the air interface using a variety of different wireless protocols. In one exemplary embodiment, the wireless device 100 communicates with the BTS 102 via the air interface using Code Division Multiple Access ("CDMA"), such as in a CDMA2000 3G packet data network.

Other wireless protocols may also be used. For example, the wireless device 100 and BTS 102 may communicate via the air interface using Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), General Packet Radio Services ("GPRS"), IS-136, Wireless Application Protocol ("WAP"), or Time Division Multiple Access ("TDMA"). Additional wireless protocol, such as the Institute of Electrical and Electronics Engineers ("IEEE") 802.11, Bluetooth or other may also be used.

The wireless device 100 can establish a data connection with the 3G wireless network, which the wireless device 100 can then use to engage in packet data communications with device on the IP network 110 or another packet data network. For example, the wireless device 100 can use industry standards to send an initiation request message to the 3G wireless network. The initiation request message can include a "packet data" service option code that characterizes the requested communication as packet-data communications, as compared with traditional voice communication.

In one exemplary embodiment of forming the data connection, the wireless device 100 accesses the 3G wireless network and establishes a PPP session with the PDSN 106. The PPP session between the wireless device 100 and the PDSN 106 is depicted conceptually by data flow 122. Once the PPP session is established, the wireless device 100 and the PDSN 106 can exchange data in the PPP session via BTS 102 and the BSC 104. It should be understood that PPP is shown merely as an example, and the wireless device 100 may communicate with the PDSN 106 using other data protocols.

As part of establishing the PPP session with the PDSN 106, the PDSN 106 may assign the wireless device 100 an IP address, or other address, that the wireless device 100 can use to engage in packet data communications with other devices. For example, the wireless device 100 may use its IP address to communicate with another device via the IP network 110, such as be establishing a data session with the other device. The wireless device 100 may additionally use other protocols in conjunction with IP, such as Mobile IP, the transmission control protocol ("TCP"), the universal datagram protocol ("UDP") or others.

The wireless device 100 can use the protocols to packetized data, which it then transmits to the PDSN 106 via the PPP Session 122. The PDSN 106 then receives the packets and sends them to the IP network 110, where they can be routed to the intended recipient. Similarly, the HA 108 may receive packets addressed to the wireless device's IP address, which the HA 108 in turn forwards to the PDSN 106 for transmission to the wireless device 100 via the PPP session 122.

Once the wireless device 100 has established a data connection and received an IP address, the wireless device 100 may roam to another BTS. Using Mobile IP, the wireless device 100 can transfer its data connection, thereby continuing in any established data sessions. If the wireless device 100 roams to BTS that is also served by the PDSN 106, the wireless device only need to update its new location with the PDSN 106. Incoming packets are then still received by the HA 108, forwarded to the PDSN 106 and then transmitted to the wireless device 100 via its current BTS. If the wireless device roams to another BTS that is also associated with the HA 108, the wireless device would update the HA 108 with its current PDSN association. Packets received at the HA 108 would then be forwarded to the new PDSN and ultimately to the wireless device 100.

If the wireless device 100 roams to a BTS serviced by a different HA, the wireless device 100 can still use Mobile IP to transfer its data connection. The wireless device 100 first registers its new location with a FA, which is actually a HA but in Mobile IP terminology is "foreign" with respect to the wireless device 100. The FA in turn contacts the HA 108 and provides a "care-of" address for the wireless device 100, which can be the IP address of the FA. Then, packets addressed to the wireless device 100 are received by the HA 108, which in turn uses the previously registered care-of address to forward the packets via a Mobile IP tunnel to the FA. The FA receives the packets, and then sends them to the wireless device.

Figure 2:
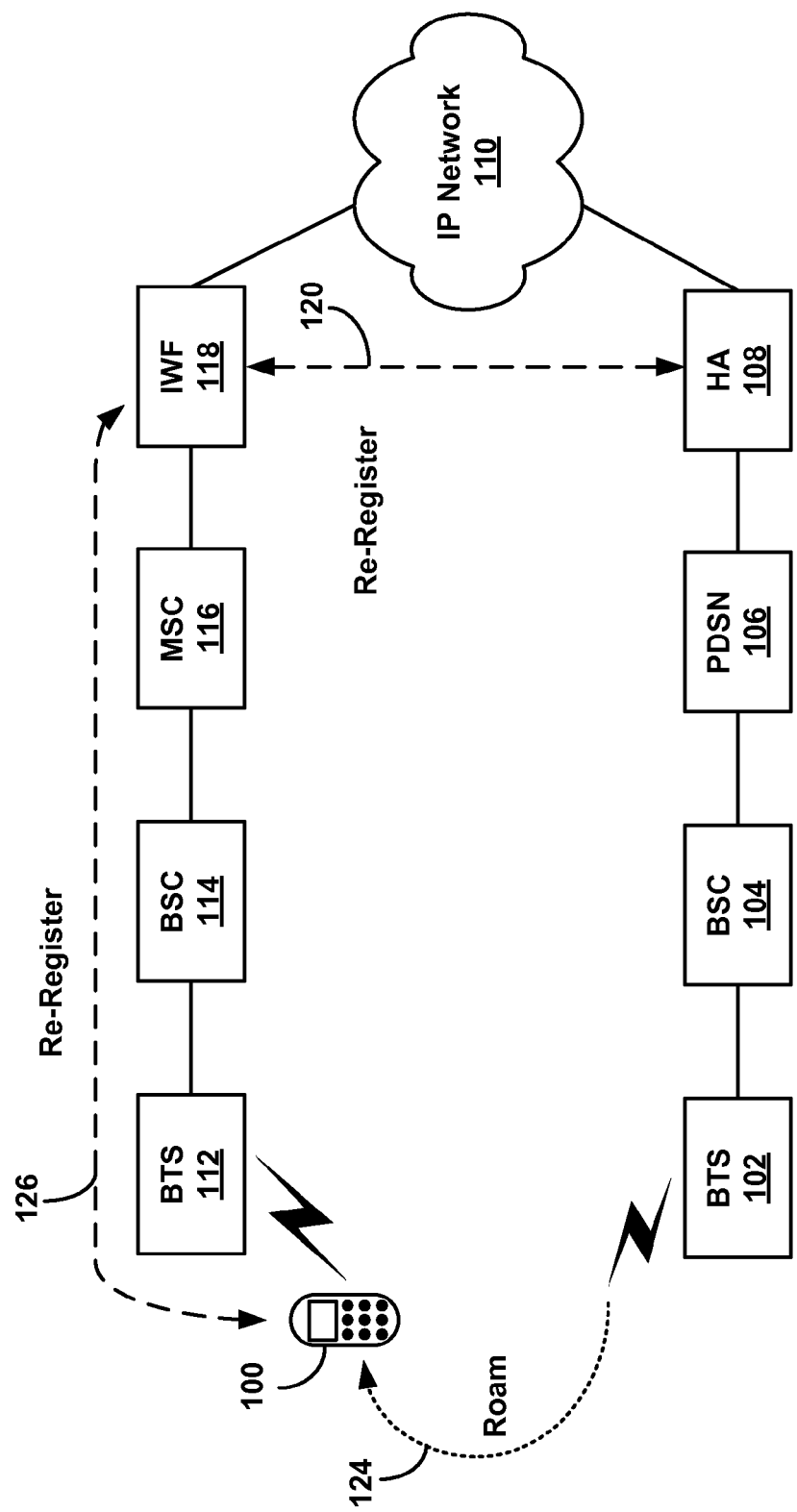
FIG. 2 is a block diagram of the wireless device of FIG. 1 re-registering on a 2G wireless network in order to transfer a data connection that the wireless device previously established on the 3G wireless network.

On a 2G wireless network, such as depicted in FIG. 2, the wireless device 100 communicates via a communication path including a BTS 112, a BSC 114, an MSC 116 and an IWF 118. The IWF 118 provides connectivity to the IP network 110, which the wireless device 100 can use to engage in packet-based communications with other devices on the IP network 110. In order to engage in packet data communications, a wireless device on the 2G wireless network first forms a circuit-based connection with the IWF 118. The IWF 118 serves as a bridge between the circuit-based connection with the wireless device on the 2G wireless network and the packet-based connection with the IP network 118.

The wireless device 100 engages in packet data communication by sending data to the IWF 118 via the circuit-based connection. The IWF 118 receives circuit-based data from the wireless device 100. The IWF 118 then packetizes the data for transmission over the IP network 110. Similarly, the IWF 118 receives packets addressed to the wireless device. The IWF 118 converts them into a format for transmission over the circuit-based connection with the wireless device, thereby bridging the circuit-based and packet-based connections.

A conventional 2G wireless network, however, does not include a HA or PDSN. Thus, a wireless device 100 cannot transfer a data connection from the 2G wireless network to a 3G wireless network or to another 2G wireless network. For example, a wireless device roaming to a 2G wireless network may attempt to send a Mobile IP re-registration message to a PDSN on the 2G wireless network. As the 2G wireless network does not include a PDSN, the re-registration message will go unanswered, and therefore the re-registration will fail. When the wireless device 100 does not receive a response from the PDSN, the wireless device 100 determines that the wireless network does not have a PDSN and is therefore a 2G wireless network instead of a 3G wireless network. The wireless device also then determines that it must establish a new data connection with the 2G wireless network instead of transferring an existing data connection.

Since the wireless device 100 is unable to transfer its existing data connection to the 2G wireless network, the wireless device's preexisting data session with other devices will no longer work. For example, those devices will continue to send packets to the HA 108 or PDSN 106 for the wireless device 100. The HA 108 and PDSN 106, however, have no information about the wireless device's current location. Thus, the HA 108 and PDSN 106 cannot forward the packets to the wireless device. Similarly, the wireless device 100 can attempt to send packets back to the other devices, but as the packet now identify a new IP address for the wireless device 100, the other devices will not recognize them as part of the data session. Therefore, the data session will eventually timeout.

In order to transfer a data connection to or from a 2G wireless network, the IWF 118 for the 2G wireless network can be modified to communicate with the HA 108 for the 3G wireless network, as shown by conceptual dataflow 120 between the IWF 118 and the HA 108. While the conceptual dataflow 120 may represent a physical connection between the IWF 118 and the HA 108, the conceptual data flow may also represent data sent between the IWF 118 and HA 108 via the IP network 110 or some other connection.

It should be understood, however, that the 2G and 3G wireless networks discussed herein are merely exemplary in nature. Other types of wireless telecommunications networks, such as 2.5G, 3.5G, 4G or others may also be used. Also, the concepts discussed herein are not limited to wireless telecommunications networks, but rather may be applied to any wireless network that uses Mobile IP or another such protocol to allow a wireless device to move between wireless networks.

Further, the concepts discussed herein are not limited to use with a wireless network that includes an IWF. Rather, they may be applied more generally to wireless networks that include other types of access servers. More generally stated, the wireless device may form a circuit-based connection with a first access server, in which the wireless device does not receive a globally routable address from the first access server. The first access server, however, may use a globally routable address to send and receive data on behalf of the wireless device. For example, the first access server may receive data from the wireless device, packetized the data, and then use a globally routable address to send the packetized data via an IP network to another device. Similarly, the other devices may use the globally routable address to send packets to the first access server, which in turn de-packetizes the data and sends it to the wireless device via the circuit-based connection.

The wireless device may further connect to a second access server, which can assign the wireless device a globally routable address. For example, the wireless device may connect to the second access server and receive an IP address from the second access server. The wireless device may then use the IP address to itself establish connections with other devices on the IP network rather than having the second access server establish these connections on behalf of the wireless device. The second access server may communicate with the first access server, such as through the IP network or another packet network. The first access server may be programmed with the functionality to allow the wireless device to transfer data connections between the first and second access servers.

FIG. 2 is a block diagram of the wireless device of FIG. 1 re-registering on a 2G wireless network in order to transfer a data connection that the wireless device previously established on the 3G wireless network. The wireless device 100 on the 3G wireless network may first form a data connection with the 3G wireless network, which the wireless device 100 can use to engage in packet data communications. For example, the wireless device 100 may form a PPP session with the PDSN 106. As part of connecting to the PDSN 106, the wireless device 100 may receive an IP address. The wireless device 100 may then using the IP address to communicate with other devices on the IP network 100, such as by establishing data session with the other devices.

After establishing the data connection with the 3G wireless network, the wireless device 100 may then roam from the 3G wireless network to the 2G wireless network, as depicted by dashed line 124. When the wireless device 100 roams to the 2G wireless network, it may currently be engaging in one or more data sessions with other devices on the IP network 110. Alternatively, the wireless device 100 may have registered with the PDSN 106 for packet data communications but not be currently participating in any such packet data sessions with other devices on the IP network 110.

Once the wireless device 100 roams to the 2G wireless network, the wireless device 100 can send a re-register message to the IWF 118. The re-register message notifies of the IWF 118 that the wireless device 100 wants to register its new location in order to transfer it existing data connection with the 3G wireless network, thereby also allowing the wireless device 100 to continue in any established data sessions with other devices. In one exemplary embodiment, the wireless device 100 uses Mobile IP to communicate with the IWF 118 and register the wireless device's new location on the 2G wireless network. Other standardized or proprietary signals protocols may also be used to register the wireless device 100 with the IWF 118.

In response to the re-register message, the IWF 118 notifies the HA 108 of the wireless device's new location. The notification from the IWF 118 to the HA 108 can occur via the conceptual dataflow 120 between the two components. In one exemplary embodiment, the IWF 118 can be programmed with Mobile IP functionality, such as by being programmed with the functionality of a PDSN or HA. The IWF 118 can use Mobile IP messages to communicate with the HA 108. Standards other than Mobile IP or proprietary signaling schemes may also be used for communication between the IWF 118 and the HA 108.

Using Mobile IP, the IWF 118 can register a new care-of address for the wireless device 100 with the HA 108. For example, the IWF 118 may use its own IP address as the "care-of" address for the wireless device 100. The HA 108 can then use the care-of address to transfer the data connection from the 3G wireless network to the 2G wireless network. For example, the HA 108 may continue to receive packets addressed to the wireless device 100. Instead of sending the packets to the PDSN 106, as would be the case if the wireless device 100 were still communicating with the BTS 102 for the 3G wireless network, the HA 108 instead sends the packets to the care-of address for the wireless device 100. Thus, the HA 108 can send the packets to the IWF 118.

The packets can be forwarded from the HA 108 to the IWF 118 in different ways, such as through a Mobile IP tunnel between the HA 108 and the IWF 118. The Mobile IP tunnel may optionally used IP Security ("IPsec"), encryption or other such security parameters. Of course, protocols other than Mobile IP could be used to forward the packets between the HA 108 and the IWF 118. The IWF 118 can receive the forwarded packets, determine they are addressed to the wireless device, and then forward the packets to the wireless device 118 via the circuit-based connection with the wireless device 100.

Figure 3:
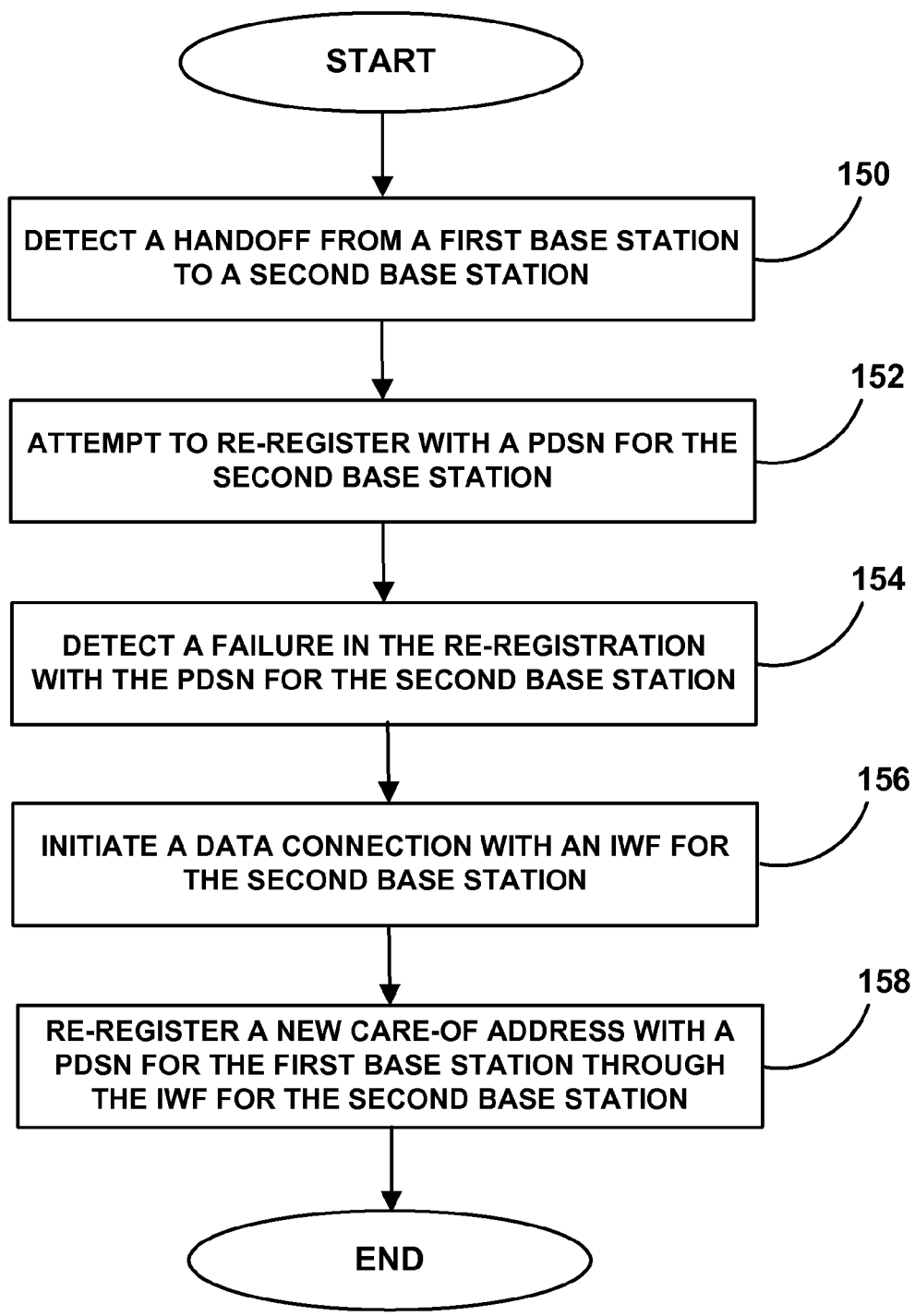
FIG. 3 is a flowchart of an exemplary process that may be used to re-register the wireless device on a 2G wireless network in order to transfer a data connection that the wireless device previously established on the 3G wireless network.

FIG. 3 is a flowchart of an exemplary process that may be used to re-register the wireless device on a 2G wireless network in order to transfer a data connection that the wireless device previously established on the 3G wireless network. At Step 150, the wireless device detects a handoff from a first base station, such as one on a 3G wireless network, to a second base station, such as one on a 2G wireless network. Then, at Step 152, the wireless device attempts to re-register with a PDSN for the second base station in order to continue a data session the wireless device previously established with the 3G wireless network. As the second base station is on a 2G wireless network and does not have a corresponding PDSN, as it would if it were on a 3G wireless network, the re-registration will fail and the wireless device will receive no response.

The wireless device detects the failure in the re-registration with the PDSN for the second base station, shown at Step 154. In response, the wireless device determines it is on a 2G wireless network, because if it were on a 3G wireless network that had a PDSN then its re-registration would have succeeded. The wireless device then initiates a data connection with an IWF for the second base station, shown at Step 156. At Step 158, the wireless device re-registers a new care-of address with a PDSN for the first base station through the IWF for the second base station.

Thus, the wireless device may send a re-registration message to the IWF, which in turn notifies the HA for the first base station of the wireless device's new location. It should be understood that the re-registration message sent from the wireless device to the IWF may be different from the re-registration message sent from the IWF to the HA. Thus, the wireless device and the IWF may communicate using a different protocol than the IWF and HA. Alternatively, they may use the same protocol but different messages.

Once re-registered, the HA for the first base station can continue to receive packets address to the wireless device. The HA then forwards the packets to the IWF, which in turn delivers them to the wireless device. Thus, the wireless device can continue to use the IP address it was assigned when it established the data connection with the 3G wireless network. Using this forwarding scheme the wireless device can continue to use its previously assigned IP address, even though the wireless device may also have been assigned a different IP address by the 2G wireless network. By continuing to use its original IP address, the wireless device can continue its existing data sessions with other devices.

Figure 4:
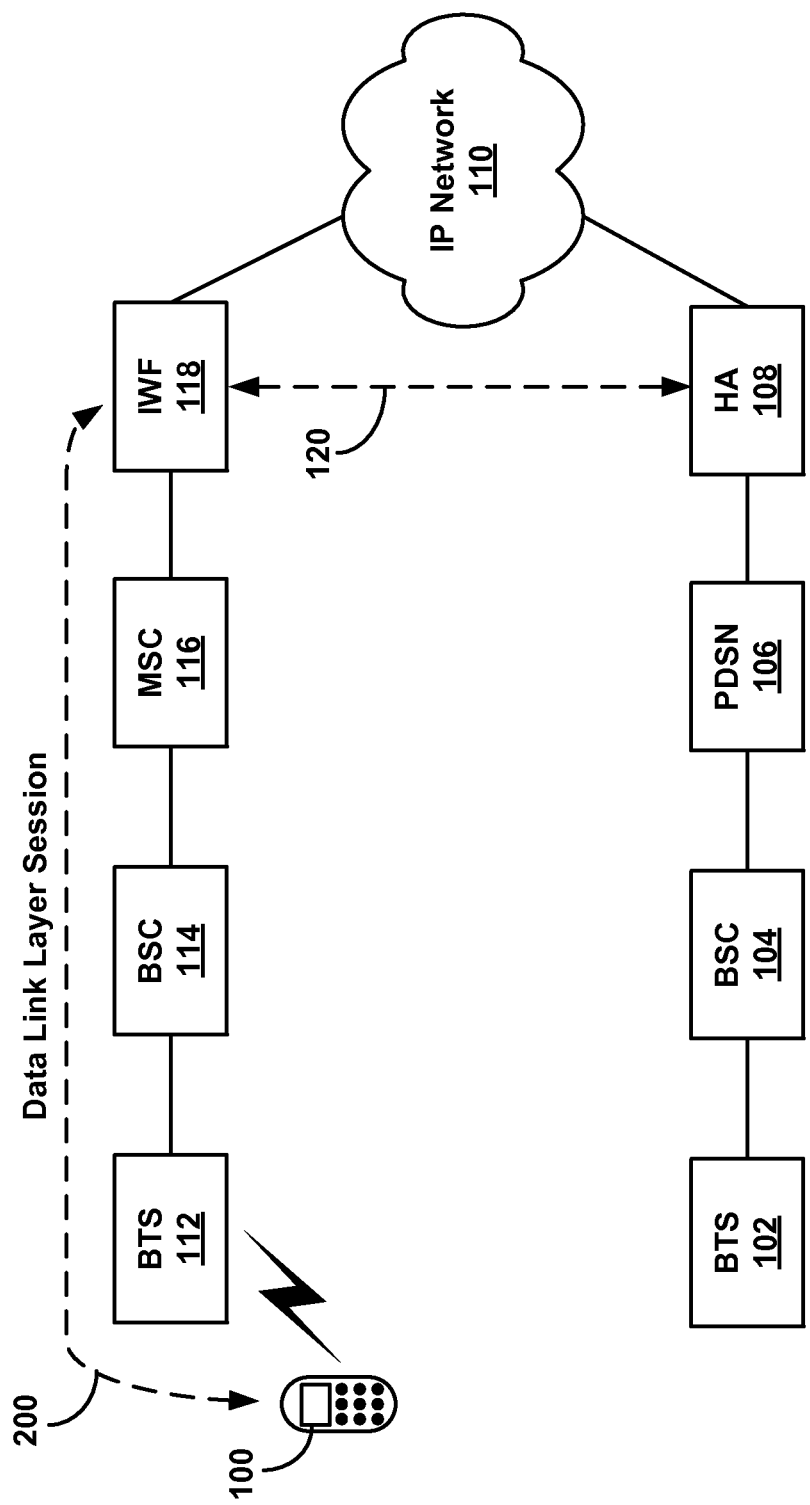
FIG. 4 is a block diagram of a wireless device establishing a data connection on a 2G wireless network that may in turn be transferred to a 3G wireless network.

The functionality of the IWF can also be used to transfer a data connection from a 2G wireless network to a 3G wireless network. FIG. 4 is a block diagram of a wireless device establishing a data connection on a 2G wireless network that may in turn be transferred to a 3G wireless network. As depicted in FIG. 4, the wireless device 100 can first establish a data connection with the 2G wireless network. For example, as shown by message flow 200, the wireless device 100 can establish a data link layer session with the IWF 118, which the wireless device 100 can then use to engage in data sessions with other devices on the IP network 110. The wireless device 100 can the roam to the 3G wireless network, and it can transfer its existing data connection from the 2G wireless network to the 3G wireless network.

Figure 5:
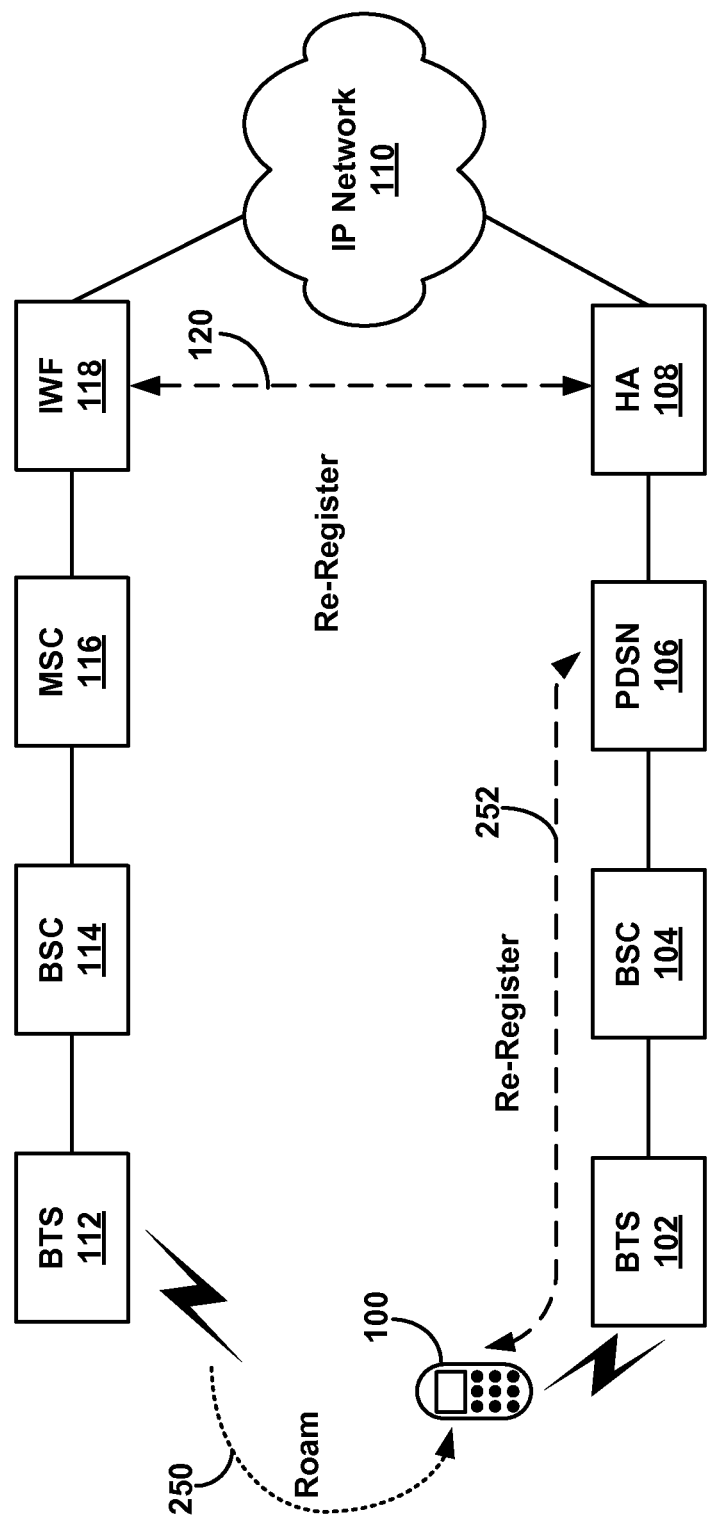
FIG. 5 is a block diagram of the wireless device of FIG. 1 re-registering on the 3G wireless network in order to transfer a data connection that the wireless device previously established on the 2G wireless network.

FIG. 5 is a block diagram of the wireless device of FIG. 1 re-registering on the 3G wireless network in order to transfer a data connection that the wireless device previously established on the 2G wireless network. As illustrated by dashed line 250, the wireless device 100 roams from the BTS 112 on the 2G wireless network to the BTS 102 in the 3G wireless network. Once the wireless device 100 roams to the 3G wireless network, it passes a re-registration message to the PDSN 106, shown by message flow 252. The PDSN 106 may in turn pass the re-registration message to the HA 108.

The HA 108 may then notify that IWF 118 of the re-registration request, via the dataflow 120. The IWF 118 then updates the current location of the wireless device 100, thereby allowing the IWF 118 to transfer the data connection from the 2G wireless network to the 3G wireless network. For example, the IWF 118 can continue to receive packets destined for the wireless device 100. Using the wireless device's re-registration, the IWF 118 then forwards the packets to the HA 108. The HA 108 receives the packets and sends them to the wireless device 100. This exemplary packet flow can occur when the IWF 118 serves as a Mobile IP HA. Alternatively, the 2G and 3G wireless networks may be configured such that the IWF 118 functions as a PDSN that is served by the HA 108 on the 3G wireless network.

In this configuration, the HA 108 would receive packets addressed to the wireless device 100. When the wireless device 100 is connected to the 2G wireless network, the HA 108 would forward the packets to the IWF 118. The IWF 118, acting as a PDSN, would receive the packets from the HA 108 and forward them to the wireless device 100 on the 2G wireless network. When the wireless device 100 is connected to the 3G wireless network, HA 108 would also receive packets for the wireless device 100. The HA 108 would then forward the packets to the PDSN 106, which would then send the packets to the wireless device 100 on the 3G network.

Figure 6:
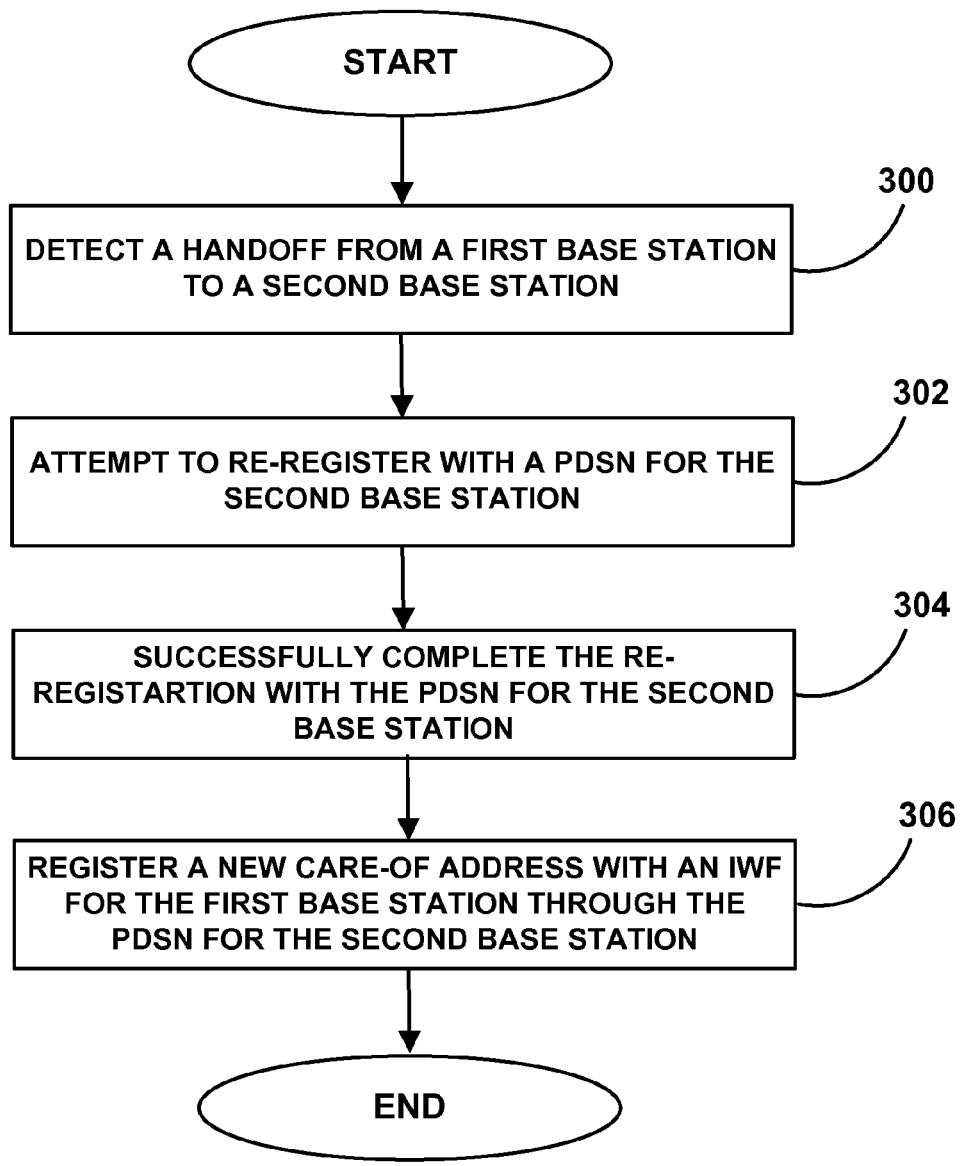
FIG. 6 is a flowchart of an exemplary process that may be used to re-register the wireless device on the 3G wireless network in order to transfer a data connection that the wireless device previously established on the 2G wireless network.

FIG. 6 is a flowchart of an exemplary process that may be used to re-register the wireless device on the 3G wireless network in order to transfer a data connection that the wireless device previously established on the 2G wireless network. At Step 300, the wireless device detects a handoff from a first base station, such as one on a 2G wireless network, to a second base station, such as one on a 3G wireless network. Then, the wireless device attempts to re-register with a PDSN for the second base station, shown at Step 302. The wireless device next successfully completes the re-registration with the PDSN for the second base station, shown at 304.

Then, at Step 306, the wireless device registers a new care-of address with an IWF for the first base station through the PDSN for the second base station. For example, the PDSN can forward a re-registration message directly to the IWF for the first base station. Alternatively, the PDSN may send a re-registration message to a HA, which in turn forwards the re-registration message to the IWF for the first base station. Once the wireless device successfully registers its new care-of address with the IWF for the first base station, the wireless device can continue to participate in the data connection it previously established on the 2G wireless network.

Figure 7:
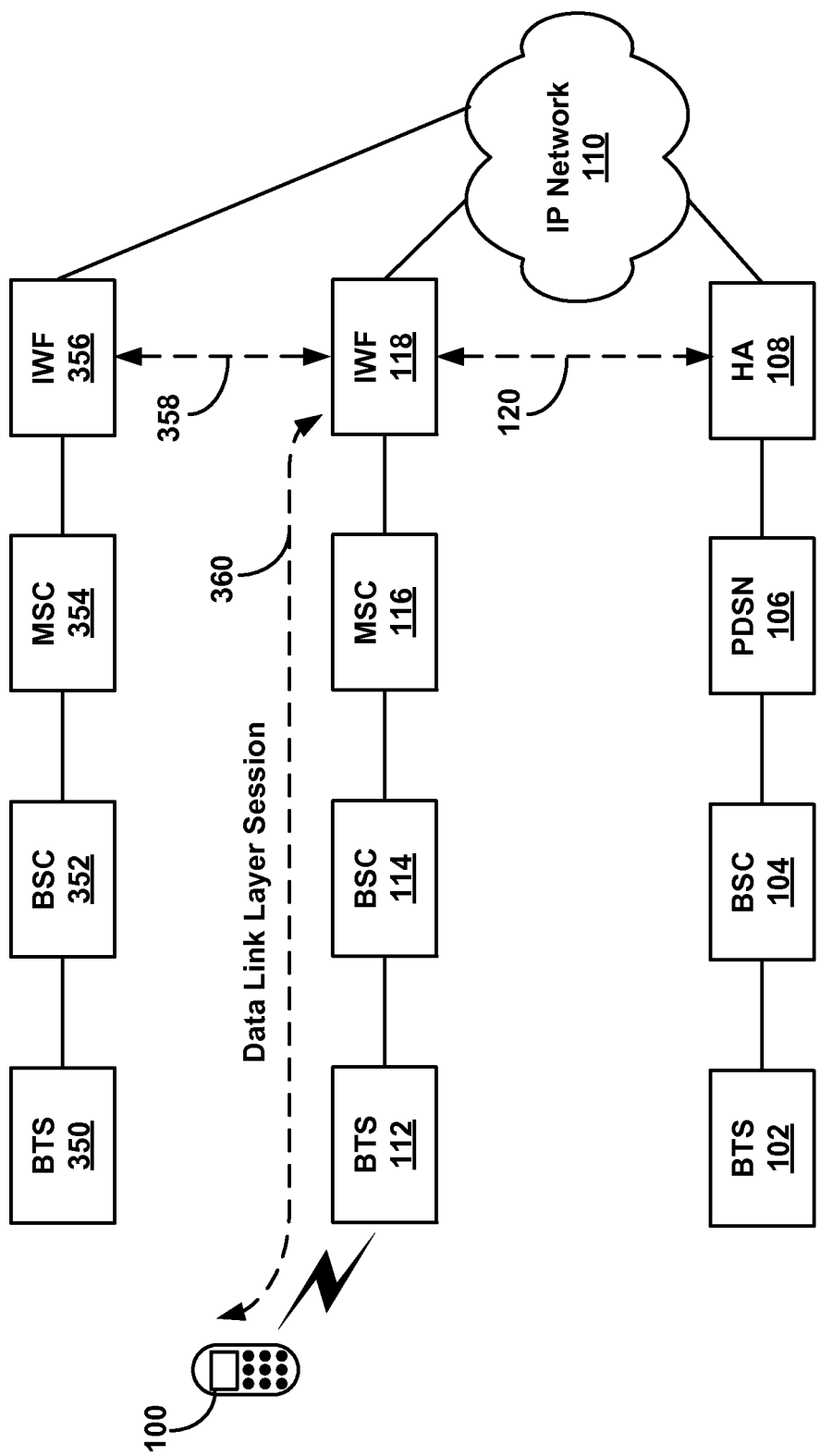
FIG. 7 is a block diagram illustrating an exemplary communication between first and second 2G wireless networks that can be used by a wireless device to transfer a data connection between the two 2G wireless networks.

In addition to allowing a wireless device to transfer a data connection between a 2G and 3G wireless network, the functionality of the IWF 118 can also be used to allow a wireless device to transfer a data connection between 2G wireless networks. FIG. 7 is a block diagram illustrating an exemplary communication between first and second 2G wireless networks that can be used by a wireless device to transfer a data connection between the two 2G wireless networks. As previously described, a first 2G wireless network includes the BTS 112, the BSC 114, the MSC 116 and the IWF 118. FIG. 7 additionally illustrates a second 2G wireless network, which includes a BTS 350, a BSC 352, a MSC 354 and an IWF 356.

The IWF 118 for the first 2G wireless network can communicate with the IWF 356 for the second 2G wireless network, as illustrated by conceptual dataflow 358. The conceptual dataflow 358 can represent data traveling between the IWFs via the IP network 110 or some other data connection. By communicating with each other, the IWFs can allow the wireless device 100 to transfer a data connection between the first and second 2G wireless networks. For example, the wireless device 100 can establish a data link layer session with the IWF 118 for the first 2G wireless network. Then, the wireless device can roam to the second 2G wireless network and transfer its existing data session to the second 2G wireless network, thereby allowing the wireless device 100 to continue in any data sessions it had established while on the first 2G wireless network.

Figure 8:
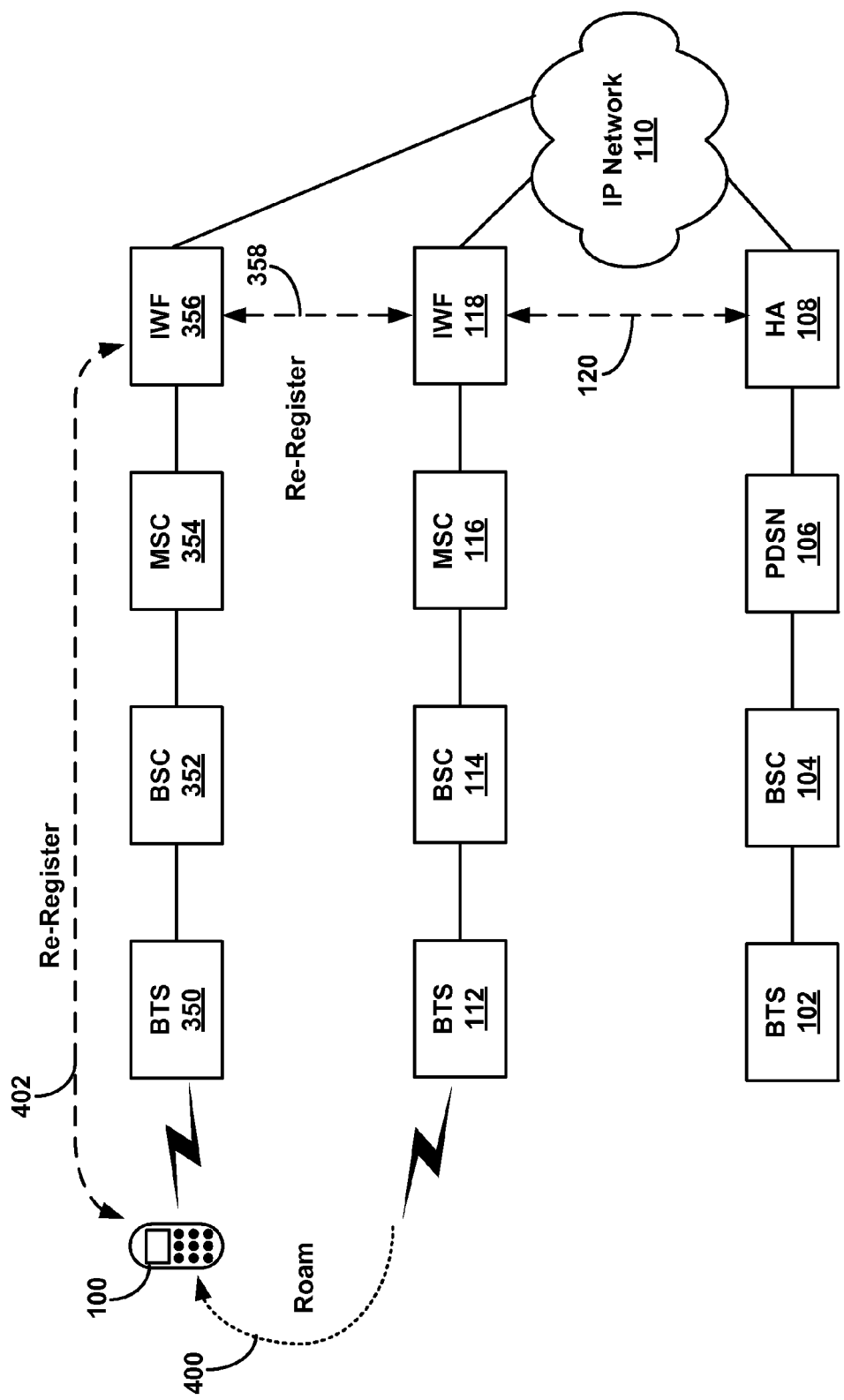
FIG. 8 is a block diagram illustrating a wireless device roaming between the first and second 2G wireless networks of FIG. 7 and re-registering on the second 2G wireless network in order to transfer a data connection from the first 2G wireless network to the second 2G wireless network.

FIG. 8 is a block diagram illustrating a wireless device roaming between the first and second 2G wireless networks of FIG. 7 and re-registering on the second 2G wireless network in order to transfer a data connection from the first 2G wireless network to the second 2G wireless network. As illustrated by dashed line 100, the wireless device 100 roams from the first 2G wireless network to the second 2G wireless network. The wireless device 100 then sends a re-register message to the IWF 356 for the second 2G wireless network. The IWF 356 for the second 2G wireless network in turn sends a re-registration request the IWF 118 for the first 2G wireless network. The re-registration request notifies the IWF 118 for the first 2G wireless network of the wireless device's new location on the second 2G wireless network.

Once re-registered on the second 2G wireless network, the wireless device can continue in the data connection that was previously established on the first 2G wireless network. For example, the IWF 118 may continue to receive packets destined for the wireless device 100. After receiving the packets, the IWF 118 for the first 2G wireless network may forward the packets to the IWF 356 for the second 2G wireless network. The IWF 356 receives the forwarded packets and sends them to the wireless device 100 on the second 2G wireless network.

Figure 9:
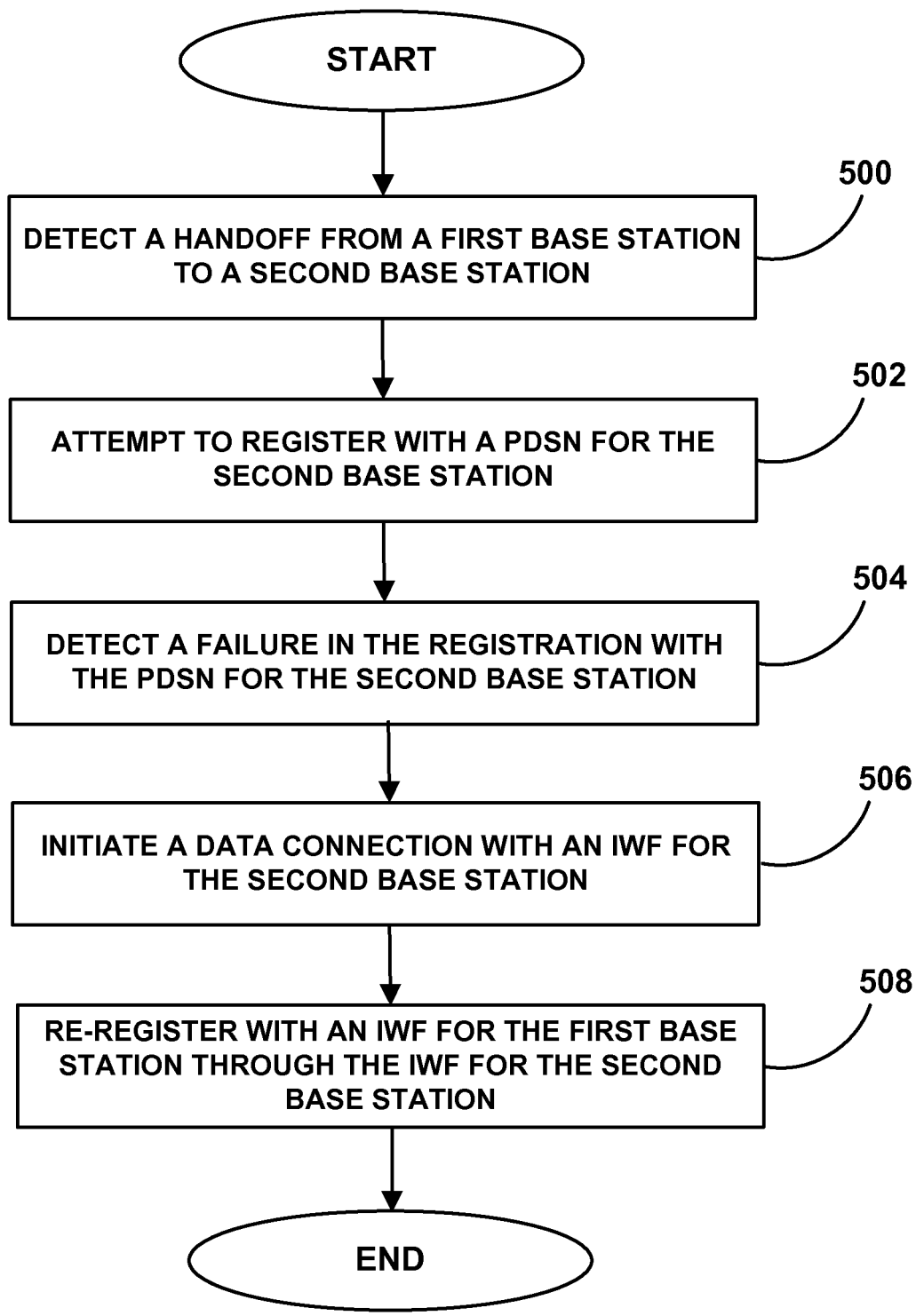
FIG. 9 is a flowchart of an exemplary process that may be used to re-register the wireless device on the second 2G wireless network in order to transfer a data connection that the wireless device previously established on the first 2G wireless network.

FIG. 9 is a flowchart of an exemplary process that may be used to re-register the wireless device on the second 2G wireless network in order to transfer a data connection that the wireless device previously established on the first 2G wireless network. At Step 500, the wireless device detects a handoff from a first base station to a second base station. Then, at Step 502, the wireless device attempts to register with a PDSN for the second base station. At Step 504, the wireless device detects a failure in the registration with the PDSN for the second base station. Since the registration with the PDSN failed, the wireless device then determines that the second base station is part of a 2G wireless network, and the wireless device initiates a data connection with an IWF for the second base station, as shown at Step 506.

Next, the wireless device re-registers with an IWF for the first base station through the IWF for the second base station, as shown at Step 508. For example, the wireless device may send a re-register message to the IWF for the second base station. The IWF for the second base station may responsively forward its address, such as an IP address, to the IWF for the first base station. This indicates to the IWF for the first base station that it should send packets addressed to the wireless device to the IWF for the second base station. Thus, when the IWF for the first base station subsequently receives packets addressed to the wireless device, the IWF for the first base station then forwards them to the IWF for the second base station, such as via an interconnection between the two IWFs. The IWF for the second base station then forwards the packets to the wireless device's current location on the second 2G wireless network.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method, comprising:
   establishing a data connection for a wireless device with a first wireless network, wherein the wireless device uses the data connection to engage in packet-based communications with devices on a packet data network, wherein the data connection uses circuit-based communications between the wireless device and an internetworking function (IWF), and wherein the IWF converts between the circuit-based communications with the wireless device and packet-based communications with devices on the packet data network;
   receiving at a home agent (HA) a request to transfer the data connection for the wireless device from the first wireless network to a second wireless network; and
   in response to receiving the request at the HA, sending from the HA to the IWF a request to transfer the data connection from the first wireless network to the second wireless network; and
   establishing a secure Mobile IP tunnel between the IWF and the HA.

2. The method of claim 1, further comprising:
   transferring the data connection from the first wireless network to the second wireless network.

3. The method of claim 1, wherein receiving at the HA a request to transfer the data connection comprises receiving from the wireless device a request to transfer the data connection from the first wireless network to the second wireless network.

4. The method of claim 1, further comprising:
   receiving over the secure Mobile IP tunnel packets addressed to the wireless device;
   generating data from the packets; and
   forwarding the generated data from the IWF to the wireless device using circuit-based communications.

5. The method of claim 1, further comprising:
   registering with the IWF a care-of address for the wireless device, wherein the care-of address identifies the HA;
   receiving at the IWF packets addressed to the wireless device; and
   forwarding the packets from the IWF to the HA based on the care-of address.

6. The method of claim 1, wherein the first wireless network is as 2G wireless telecommunications network, and wherein the second wireless network is a 3G wireless telecommunications network.

7. The method of claim 1, wherein the wireless device is a mobile phone, personal digital assistant or two-way pager.

8. A method, comprising:
   establishing a data connection for a wireless device with a home agent (HA) in a first wireless network, wherein the wireless devices uses the data connection to engage in packet-based communications with devices on a packet data network;
   receiving at an interworking function (IWF) a request to transfer the data connection for the wireless device from the first wireless network to a second wireless network;
   in response to receiving the request at the IWF, sending from the IWF to the HA a request to transfer the data connection from the first wireless network to the second wireless network, wherein the IWF converts between circuit-based communications with wireless devices on the second wireless network and packet-based communications with devices on the packet data network; and
   establishing a secure Mobile IP tunnel between the IWF and the HA.

9. The method of claim 8, further comprising:
   transferring the data connection from the first wireless network to the second wireless network.

10. The method of claim 8, wherein receiving at the IWF a request to transfer the data connection comprises receiving from the wireless device a request to transfer the data connection from the first wireless network to the second wireless network.

11. The method of claim 8, the method further comprising:
    receiving at the HA packets addressed to the wireless device; and
    forwarding the packets from the HA to the IWF via the secure Mobile IP tunnel.

12. The method of claim 8, wherein the first wireless network is a 3G wireless telecommunications network, and wherein the second wireless network is a 2G wireless telecommunications network.

13. The method of claim 8, wherein the wireless device is a mobile phone, personal digital assistant or two-way pager.

* * * * *